W. H. THOMPSON.
SYSTEM OF ELECTRIC MOTOR CONTROL.
APPLICATION FILED JAN. 5, 1907.
977,571.
Patented Dec. 6, 1910.
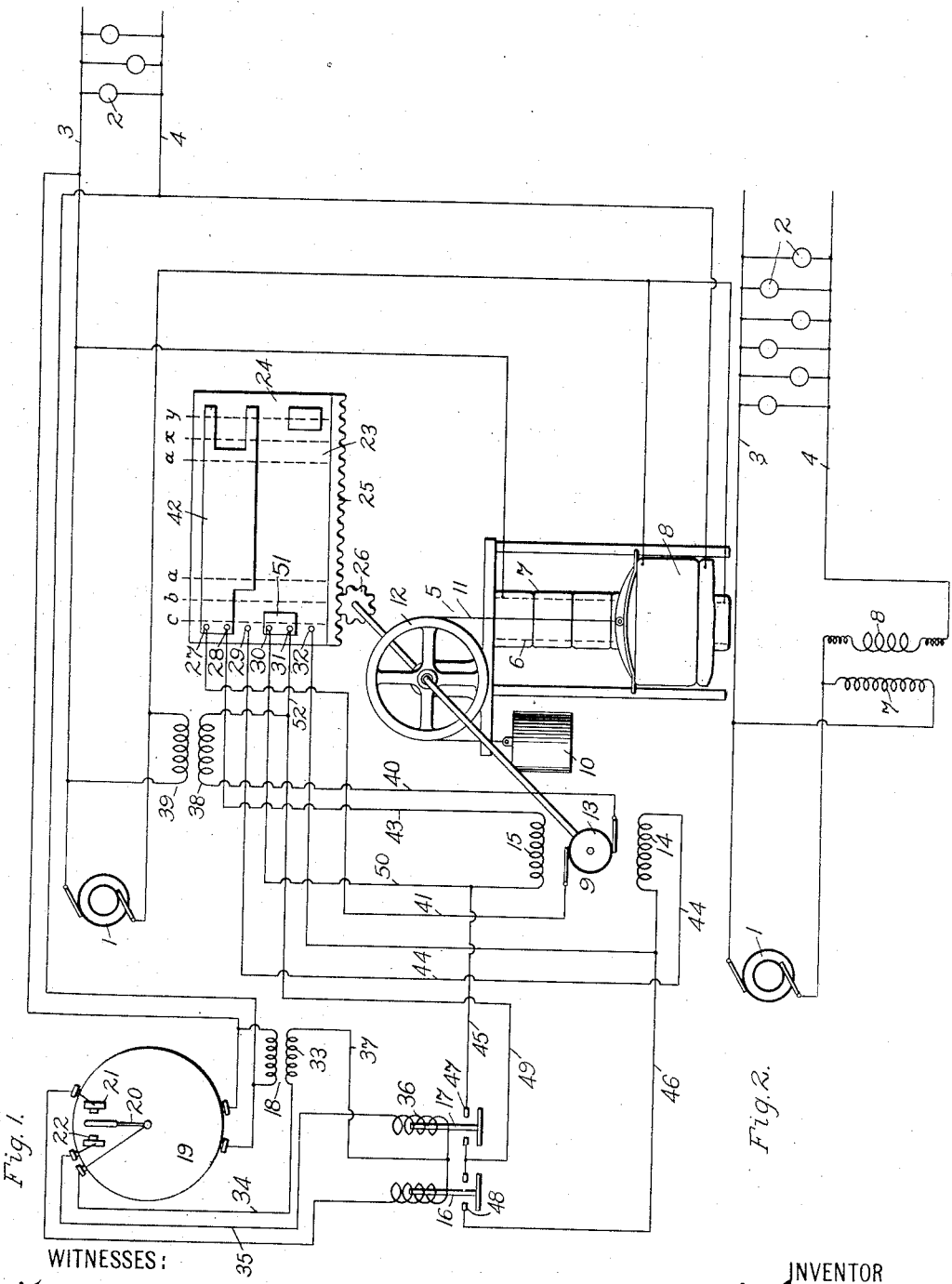
WITNESSES:
Fred H. Miller
R. J. Dearborn
INVENTOR
Wilbur H. Thompson
BY
Wesley G. Carr
ATTORNEY

UNITED STATES PATENT OFFICE.

WILBUR H. THOMPSON, OF WILKINSBURG, PENNSYLVANIA, ASSIGNOR TO WESTINGHOUSE ELECTRIC & MANUFACTURING COMPANY, A CORPORATION OF PENNSYLVANIA.

SYSTEM OF ELECTRIC-MOTOR CONTROL.

977,571.

Specification of Letters Patent. Patented Dec. 6, 1910.

Application filed January 5, 1907. Serial No. 350,953.

*To all whom it may concern:*

Be it known that I, WILBUR H. THOMPSON, a citizen of the United States, and a resident of Wilkinsburg, in the county of Allegheny and State of Pennsylvania, have invented a new and useful Improvement in Systems of Electric-Motor Control, of which the following is a specification.

My invention relates to systems of electric motor control, and it has for its object to provide means for controlling electric motors, the operation of which is confined to predetermined limits in either direction, that shall be simple in arrangement; that shall stop the motor at the limits of its travel in a relatively short time, and that shall automatically prevent its further operation in the same direction.

Electric motors are frequently employed for operating automatic potential regulators and gate valves and in other relations where it is desirable to automatically bring the motor to rest when predetermined limits of its travel in either direction are reached. In the prior art, the motor circuit has been automatically interrupted and brakes have sometimes been applied to stop the motor, but the momentum of its moving parts usually causes the motor to run past the limits which are predetermined by the driven mechanism and, if gears are employed for a driving connection, the binding friction sometimes is so great that it is impossible to start the motor in the opposite direction.

These difficulties are avoided by my present invention, which provides means for automatically interrupting the motor circuit, supplying energy thereto for reverse rotation and again interrupting the motor circuit. In this way, the motor is brought to rest within a very short space and is in fact given a very slight backward movement, so that it is ready to respond to an automatic governor which normally determines the direction and amount of its travel.

Figures 1 and 2 of the accompanying drawings are diagrammatic views of a system of electric motor control arranged in accordance with my invention.

The electric motor illustrated is adapted to operate a potential regulator of well known type, but it will be readily understood that its application is not restricted to this or any other specific use.

Referring to the drawings, electric energy is supplied from a generator 1 to translating devices 2, through conductors 3 and 4 and the potential of the circuit is maintained substantially constant by means of a regulator 5. This regulator comprises a magnetizable core member 6, stationary coils 7 and movable coils 8, the position of which is determined by a regulating motor 9. The movable coils 8 are substantially counterbalanced by a weight 10 to which they are connected by means of a cord or chain 11 that passes over a rotatably mounted sheave or pulley 12, the regulating motor being mechanically connected to the pulley shaft.

The motor 9 comprises an armature 13 and field magnet windings 14 and 15 by means of which the motor may be reversed without changing the direction of current flow in the armature and with a minimum number of circuit changes. The field magnet windings 14 and 15 are selectively connected in circuit by electrically operated switches 16 and 17 which are energized from a transformer 18 or from some other convenient source dependent upon a meter relay 19. The relay 19 is connected across the line conductors 3 and 4 and comprises a movable contact member 20 and stationary contact members 21 and 22.

The operation of the motor 9 is confined to limits in either direction, which are determined by, and correspond to, the normal range of the regulator 5, by means of a switching or limiting device 23 which comprises a movable contact-bearing member 24 that is connected to the motor shaft by means of a rack 25, a pinion 26, and relatively stationary contact fingers 27, 28, 29, 30, 31 and 32.

The operation of the system is as follows: Assuming that the regulator 5 occupies its mid-position of regulation, and that the electromotive force of the circuit adjacent to the translating device corresponds to that of the generator 1, the switching device 23 will occupy a position between the broken lines $a$ and the motor 9 will be at rest, since the movable contact member 20 of the meter relay 19 occupies a position substantially midway between the stationary members 21 and 22, according to usual practice. If the voltage delivered from the generator 1 is now increased, for any reason, movement of the member 20 of the meter relay will be so effected as to complete a circuit from a secondary winding 33 of the transformer 18, through conductor 34, contact members 20 and 22, conductor 35, operating magnet 36 of the switch 17 and conductor 37. When current is supplied to magnet coil 36, the switch 17 is closed, and energy is supplied from a secondary winding 38 of a transformer 39, which may be replaced by any other convenient source of electric current, through conductor 40, armature 13, conductor 41 and contact finger 27, to contact member 42. From this point, two branch circuits are continued through contact fingers 28 and 29, which are in engagement therewith, conductors 43 and 44, field magnet windings 15 and 14 and conductors 45 and 46 to stationary contact members 47 and 48 of the electrically operated switches 17 and 16. Circuit may be completed from these points through the switches 16 and 17 and conductors 49 and 50, but since only the switch 17 is closed, the circuit is now completed through armature 13 and the field magnet winding 15 of the motor 9. The circuit connections are such that the operation of the motor thus effected tends to cause the controller 23 to approach its position $x$ and to so move the regulator as to correct voltage variations in the circuit 3—4. From the circuit connections, as above traced, it will be readily understood that when the generator voltage falls below a predetermined amount and the movable contact member 20 moves into engagement with the contact member 21, the switch 16 will be closed and energy will be supplied to the armature 13 and field magnet winding 14 of the motor 9. In this way, the position of the moving coil of the regulator 5 will be changed to effect a suitable correction in the generator electromotive force, provided such variations do not exceed predetermined limits in either direction. In case a large decrease in the generator voltage occurs causing the switch 16 to close, the motor 9 will continue to operate in one direction in its attempt to correct for this variation until the switching device 23 passes out of its intermediate position and into the position $b$, whereupon the contact finger 29 will be disengaged from the contact member 42 and the motor circuit will consequently be interrupted. By reason of the momentum of its rotating part, the motor will ordinarily drift until the switching device 23 occupies position $c$. In this event energy is supplied to the motor through armature 13 and field magnet winding 15, since a circuit, independent of the switches 16 and 17 is completed from the transformer winding 38 through conductor 52, contact fingers 30 and 31, which now engage contact member 51 and conductor 50. The motor 9 is thus reversed and is consequently brought to rest very suddenly and operates in a reverse direction until the contact fingers 30 and 31 are disengaged from the contact member 51. By suitable design and arrangement of the contact members of the limiting device 23, the motor is brought to rest when this device occupies position $b$, where the operation of the motor is limited to one direction, corresponding to that in which the regulator is free to move. The positions $x$ and $y$ correspond to positions $b$ and $c$ for the opposite limit of the motor travel, the contact finger 28 here being disengaged from the contact member 42.

It is evident that variations in the arrangement of the apparatus and in the circuit connections of the system may be effected within the spirit and scope of my invention.

I claim as my invention:

1. In a control system, the combination with an electric motor, of a single controlling means which is operated by the motor and acts to automatically interrupt its circuit at a predetermined limit in each direction and to supply energy to the motor in a reverse direction and finally to open its circuit.

2. In a control system, the combination with an electric regulator and an operating motor therefor, of a controller for effecting a temporary reversal of the motor and for automatically bringing it to rest at predetermined limits in the motor travel.

3. In a control system, the combination with a driven mechanism that is confined in its motion to predetermined limits, of a driving motor, and a single controlling means which serves to interrupt the supply of energy to the motor and to temporarily reverse the motor when either of said limits is reached.

4. In a regulating system, the combination with a driven mechanism the motion of which is restricted to definite limits, of a driving mechanism therefor, an automatic reversing governor for said driving mechanism, and means independent of the automatic governor for interrupting the supply of energy to the driving mechanism and for temporarily reversing the same at points in its travel which correspond to the limits of the driven mechanism.

5. The combination with an electric regulator comprising stationary and movable coils, a driving motor for said movable coils, and an automatic reversing governor for the motor, of means independent of the automatic governor for interrupting the supply of energy to the motor and for temporarily reversing the motor at predetermined limits in its travel.

6. The combination with an electric circuit, an automatic potential regulator having relatively stationary and movable coils the relative motion of which is restricted to definite limits, of an electric driving motor, an automatic governor or selective switching device that normally governs the operation of the motor, and means independent of the automatic governor for interrupting the supply of energy to the motor and for temporarily reversing the motor at predetermined limits of its travel.

7. The combination with a plurality of translating devices, an electric generator from which energy is supplied thereto, an automatic potential regulator for the circuit comprising relatively stationary and movable coils the relative motion of which is restricted to definite limits, a driving motor for the regulator, a meter relay device and coöperating switches for normally controlling the operation of the motor, said device being dependent upon variations in the voltage of the circuit, and means independent of the relay for interrupting the supply of energy and for temporarily reversing the motor at predetermined limits in the movement of the regulator.

In testimony whereof, I have hereunto subscribed my name this 31st day of December, 1906.

WILBUR H. THOMPSON.

Witnesses:
CHAS. B. GIBSON,
BIRNEY HINES.